Aug. 30, 1932.                J. F. OHMER ET AL                    1,875,119
                TICKET PRINTING, ISSUING, AND RECORDING MACHINE
                     Filed Jan. 2, 1926           6 Sheets-Sheet 2
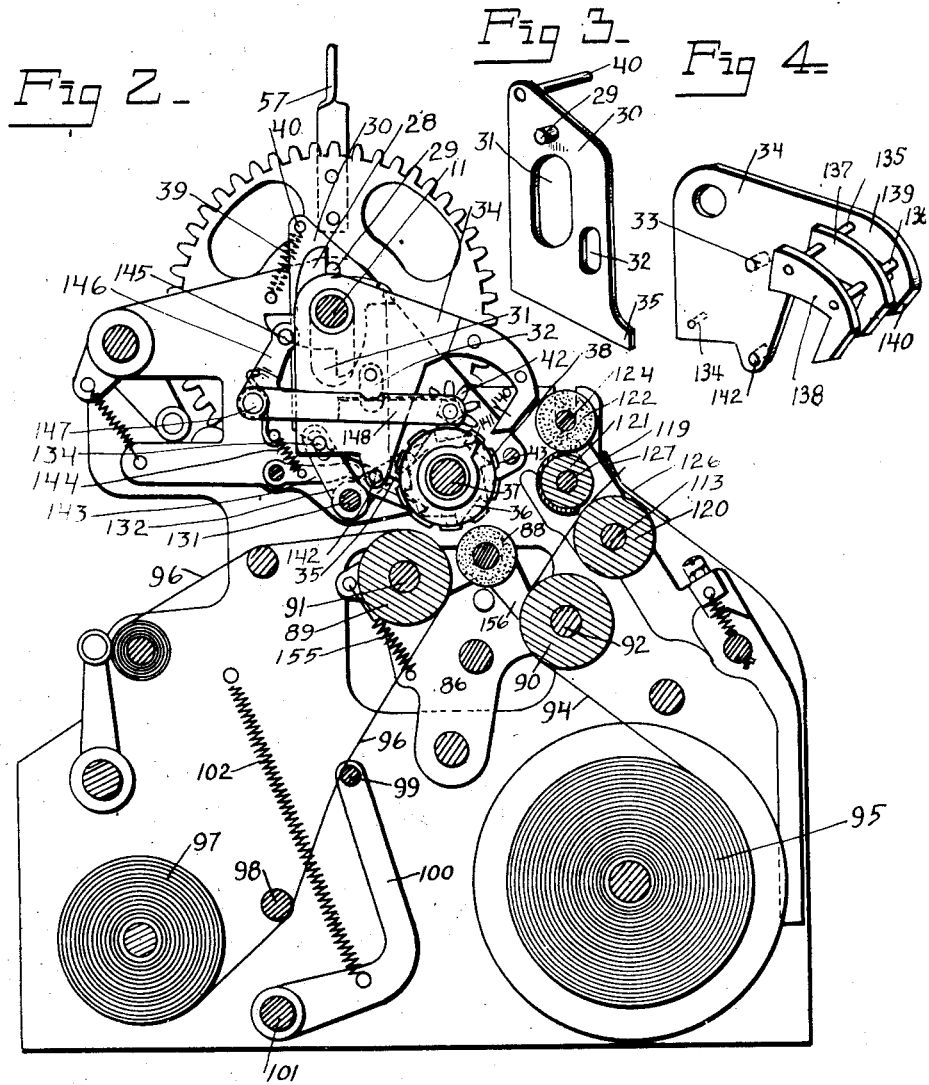
INVENTORS
John F. Ohmer
BY  Grover C. Coil
Hastings W. Baker ATTORNEY Aug. 30, 1932.  J. F. OHMER ET AL  1,875,119
TICKET PRINTING, ISSUING, AND RECORDING MACHINE
Filed Jan. 2, 1926   6 Sheets-Sheet 3
Fig 7-
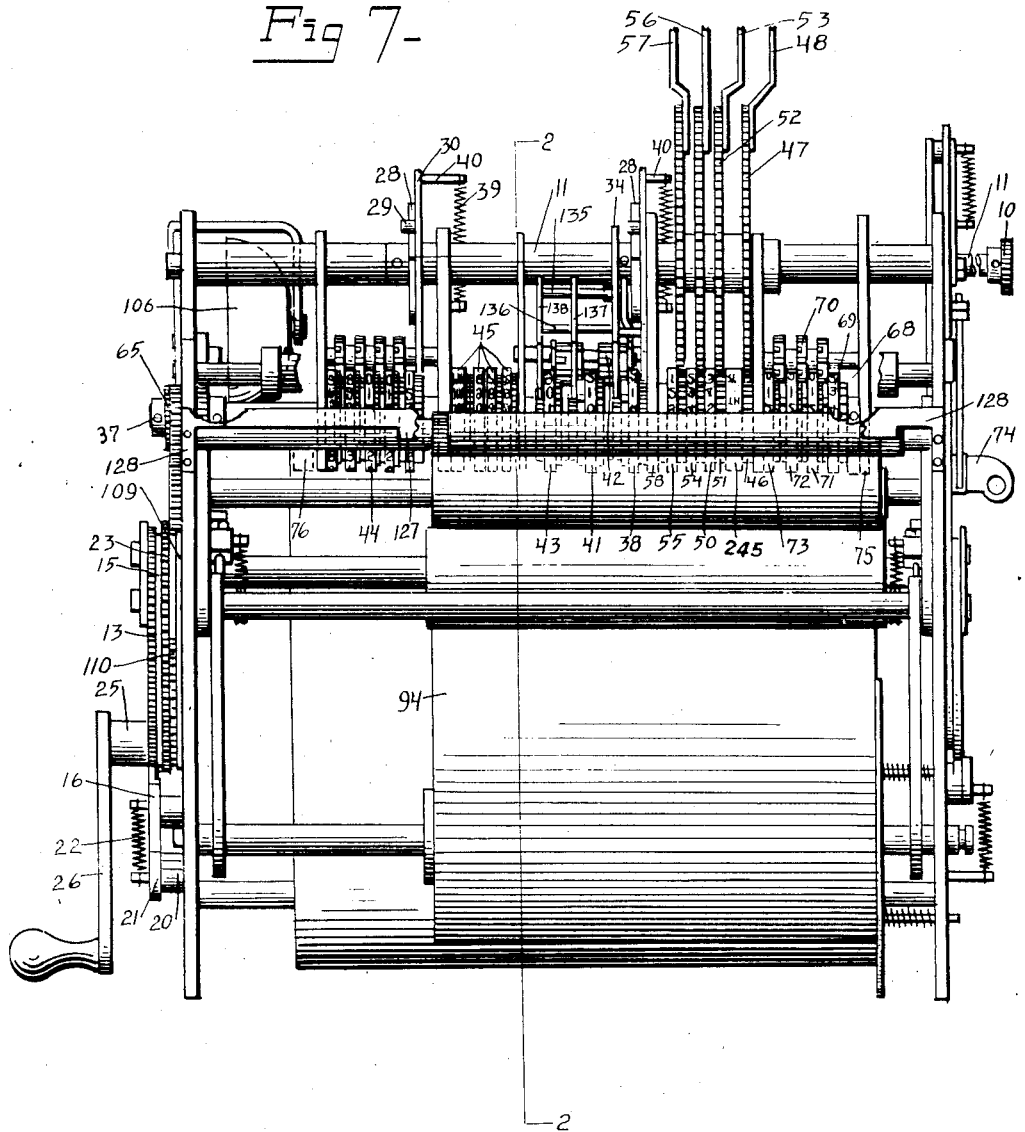
INVENTORS
John F. Ohmer
Grover C. Coil
BY Hastings W. Baker ATTORNEY

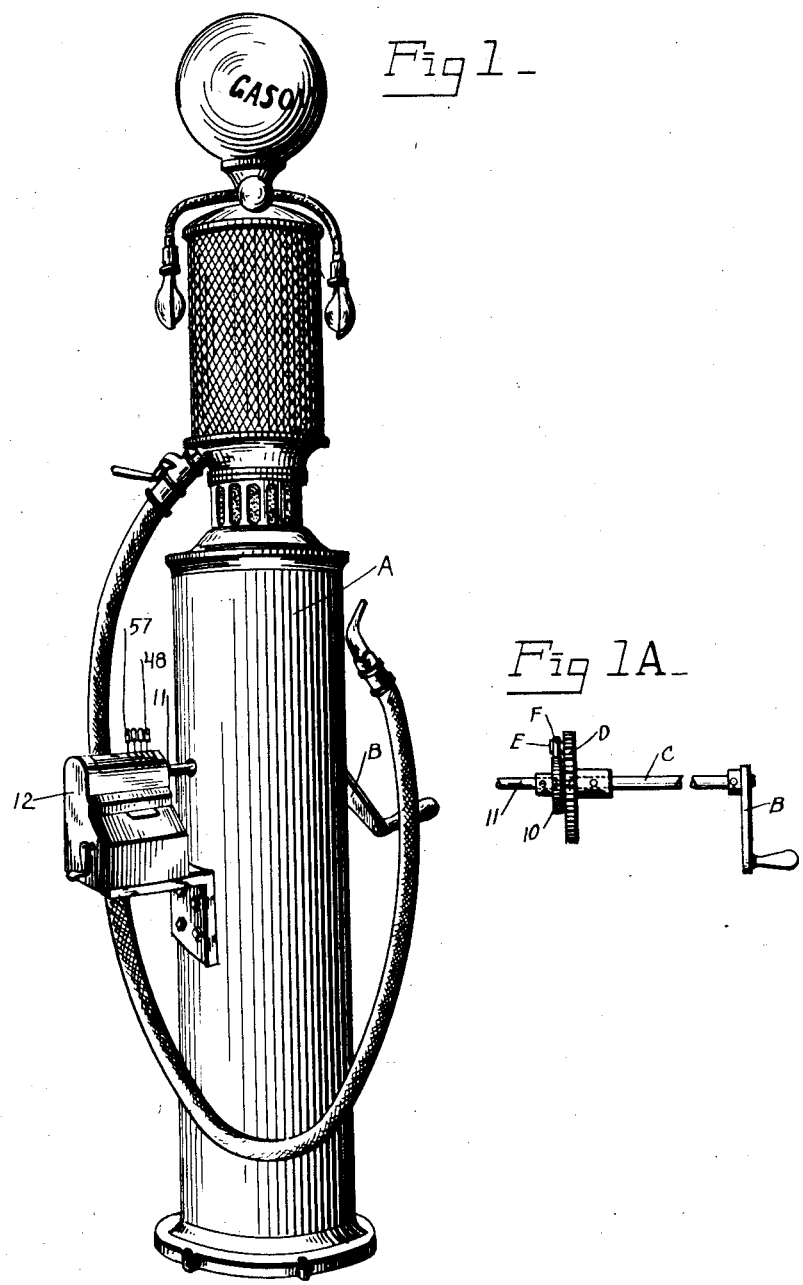

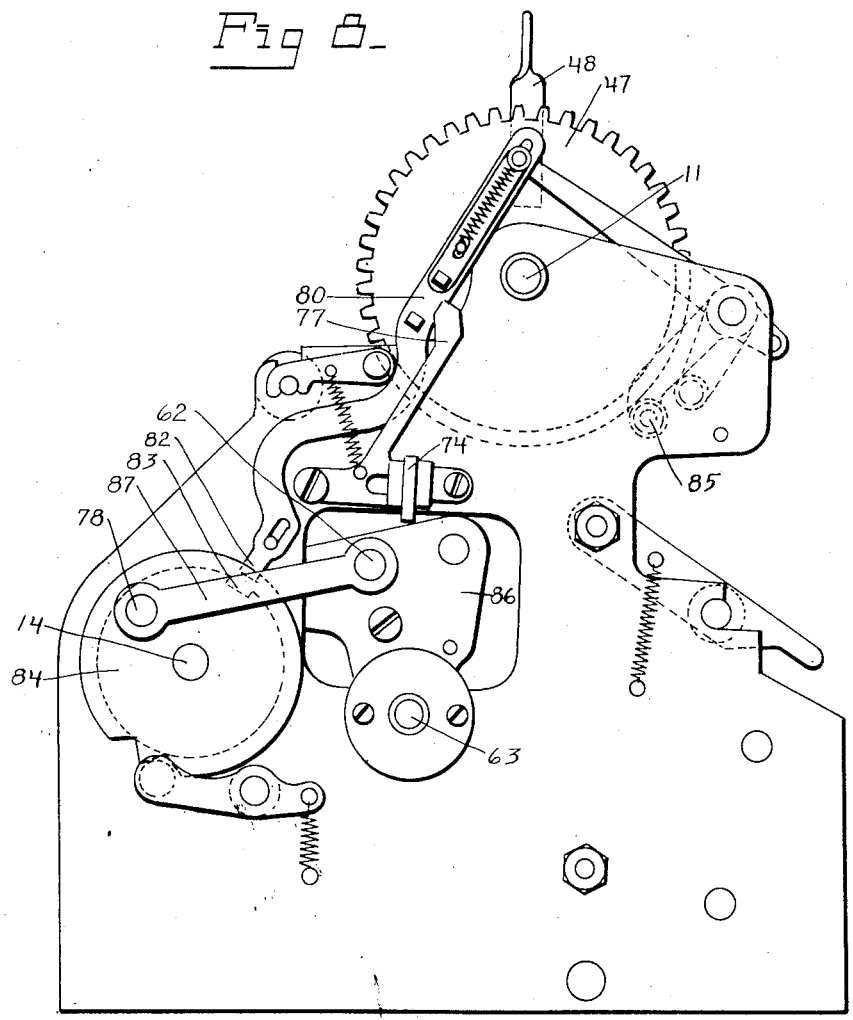

Aug. 30, 1932.  J. F. OHMER ET AL  1,875,119
TICKET PRINTING, ISSUING, AND RECORDING MACHINE
Filed Jan. 2, 1926  6 Sheets-Sheet 5
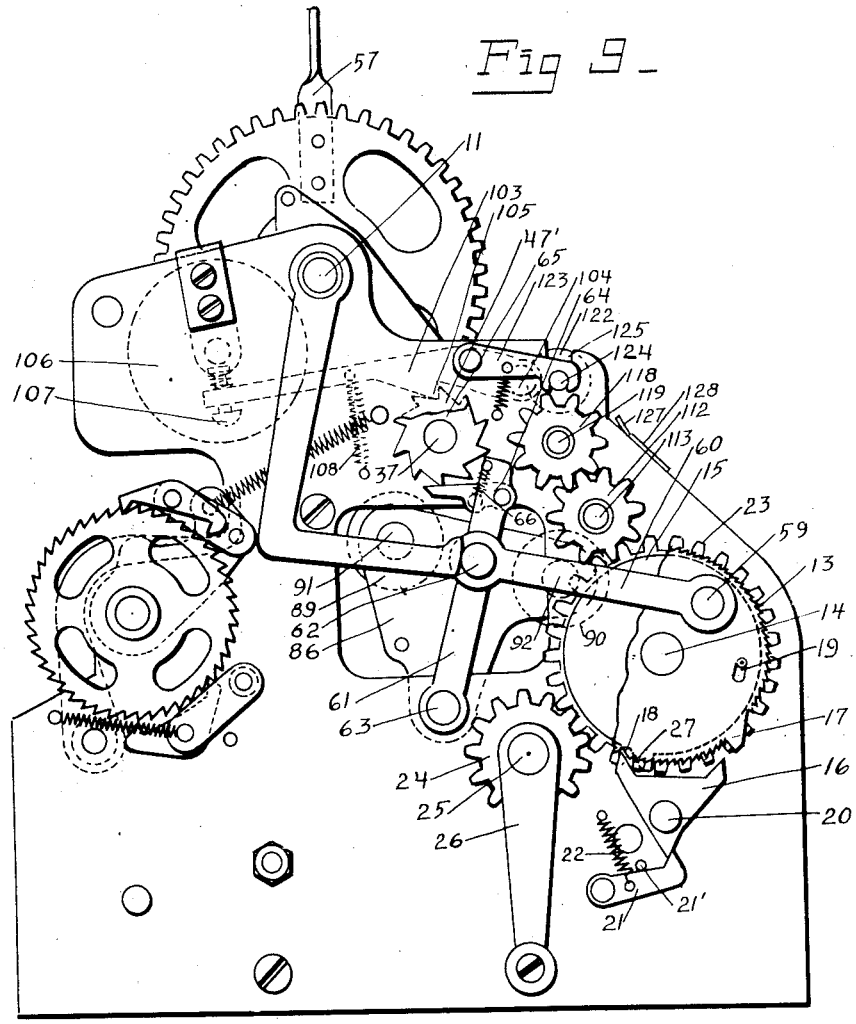
INVENTORS
John F. Ohmer
Grover C. Coil
BY Hastings W. Bafer ATTORNEY

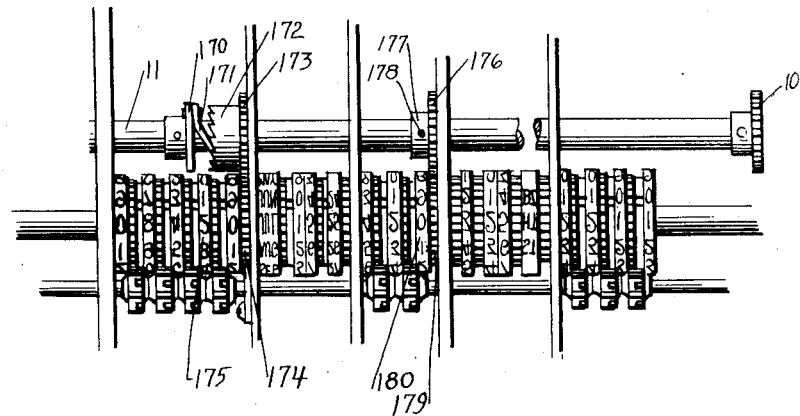

Patented Aug. 30, 1932

1,875,119

UNITED STATES PATENT OFFICE

JOHN F. OHMER AND GROVER C. COIL, OF DAYTON, OHIO, ASSIGNORS TO OHMER FARE REGISTER COMPANY, OF DAYTON, OHIO, A CORPORATION OF NEW YORK

TICKET PRINTING, ISSUING AND RECORDING MACHINE

Application filed January 2, 1926. Serial No. 78,906.

This invention relates to an improved ticket printing, issuing and recording machine, and is an improvement on the applications of John F. Ohmer and Albert S. Wheelbarger, Serial No. 53,082, filed August 28, 1925, and Albert S. Wheelbarger and Grover C. Coil, Serial No. 65,532, filed October 29, 1925, both of which applications have been duly assigned to the Ohmer Fare Register Company, Dayton, Ohio.

More specifically, the improvements disclosed in this invention relate to a ticket issuing and recording machine for gasoline stations, or any places where fluid may be sold. Heretofore, a driver of an automobile desiring to purchase gasoline has not received any ticket showing the amount of his purchase and the number of gallons received, nor has there been any check on the operations of the employee in charge. This has led to a number of abuses by the employee, such as, in not dispensing to the customer the number of gallons requested or in charging him a higher rate per gallon than was authorized. Furthermore, the owner of the gasoline station has had no check on the operations, and has been forced to accept whatever amount of money was turned over to him by his employee. Naturally, under such circumstances an unscrupulous operator would be tempted to defraud both the customer and the owner of the service station. While this has been particularly flagrant in regard to gasoline, the same abuses have existed in regard to dispensing other fluids, such as oil and the like.

The object of this invention is to provide an accurate and reliable register which will issue a receipt showing the date of the transaction, the serial number, the number of gallons and pints purchased, and the class of fluid sold, such as high test gasoline, regular, or oil, and the price charged for the commodity.

A further object of the invention relates to means whereby a permanent record may be printed and retained within the machine, which record would be a duplicate of the ticket except that no advertising matter would be printed thereon, and if desired, additional data might be printed to show the number of the machine, the number of the operator, and the total number of gallons of liquid sold.

Another object of the invention is to provide means whereby the registers indicating the quantity sold may be returned to zero, or reset by the reverse rotation of the pump crank handle, or by simply printing the ticket and record.

It is felt that this invention would put an end to the glaring abuses that have heretofore existed in regard to transactions at a filling station, and would afford absolute proection to the buyer as well as to the seller, so that it would be impossible for the employee to defraud either partly without the same being obvious. These and other objects will appear in the detailed specification which follows.

In the drawings, in which like reference characters are used to denote corresponding parts throughout, Fig. 1 is an elevational view of a conventional gasoline filling unit with our improved register attached thereto, Fig. 1A is a detailed view of the operating means for the register, Fig. 2 is a cross-sectional view of the register on the line 2—2 of Fig. 7, looking in the direction of the arrows, Fig. 3 is a perspective view of one of the operating dogs for the quantity printers, for both the total adder and for the detailed sales record, Fig. 4 is a perspective view of one of the resetting plates, Fig. 5 is an elevational view of one of the printing wheels, Fig. 6 is a detailed view of the means for actuating the resetting mechanism, Fig. 7 is an elevational view of the front of the machine with the casing removed, Fig. 8 is an elevational view of the left side of the machine, Fig. 9 is an elevational view of the right side of the machine, Fig. 10 is a representation of the record as produced by the machine, Fig. 11 is a representation of the ticket as issued, and Fig. 12 is a modification of the operating means for the total adder, and the operating and resetting means for the detail quantity counter.

Referring to the drawings in detail, a gasoline unit A is indicated, provided with the conventional crank handle B mounted on a shaft C which carries a gear D which serves as the means for operating the gasoline pump unit, which mechanism forms no part of this invention and is, therefore, not shown in the drawings. The gear D is provided with a pin E, which carries a dog F, which actuates a ratchet 10 rigidly mounted on a shaft 11.

The casing 12 is similar to the casing shown in the above mentioned application 65,532 and need not be described in this application.

A full stroke mechanism is provided, as best seen in Figs. 7 and 9, which consists of a ratchet 13 rigidly mounted on the shaft 14, a disk 15, a gear 23 rotatably mounted thereon, and a double-nosed dog 16. The ratchet 13 is provided with ratchet teeth for the major portion of its circumference, and is also provided with a large tooth 17. The disk 15 is provided with a single tooth 18. The disk 15 is rotatably mounted on the shaft 14, and is operatively connected with the ratchet 13 by means of a pin and slot connection 19. The dog 16 is pivoted on a stud shaft 20 and is provided with a nose actuated by the tooth 17, and a second nose actuated by the tooth 18. The dog 16 is V shaped and is held in either of its two positions by means of a lever 21. The lever 21 is normally urged towards a stop pin 21' by means of a spring 22. Secured to the disk 15 is a gear 23 which gear is rotatably mounted on the shaft 14 and is in mesh with a pinion 24 secured to a shaft 25, on which shaft is mounted the crank handle 26. The pinion 24 is one-half the size of the gear 23 so that the crank handle 26 must be rotated twice in order to rotate the gear 23 and shaft 14 one complete revolution. After a ticket has been completely issued, the dog 16 is in the position shown in Fig. 9, with the tooth on the left hand side thereof engaging the tooth 27 on the ratchet 13. The crank handle 26 is normally rotated in a clockwise direction in order to print and issue the tickets as well as to print the record, but when the parts are in the position shown in Fig. 9 the crank handle cannot be rotated in a clockwise direction, for the gear 23 will be rotated in an anti-clockwise direction and the nose of the dog 16 engaging the ratchet 13 prevents such a rotation. The crank handle 26 must, therefore, be rotated in an anti-clockwise direction for a small distance, so that the tooth 27 engages the nose of the dog, rocking the same in an anti-clockwise direction. The lower end of the dog 16 carries the lever 21 downwardly until the end of the lever 21 passes the lower extremity of the dog 16, whereupon the spring 22 pulls the lever 21 upwardly, holding the right hand nose of the dog 16 against the tooth 17 of the ratchet 13. The ratchet can now be rotated in a clockwise direction by means of the pin and slot connection 19. At the end of a complete rotation, the tooth 17 of the ratchet 13 engages the right hand nose of the dog 16 and rocks the dog 16 into the position shown in Fig. 9. As the dog 16 was being thus rocked, the lever 21 was depressed until the upper end thereof passes the lower extremity of the dog 16, and the spring 22 then pulls the lever 21 upwardly holding the dog 16 in that position. The object of the pin and slot connection 19 is to permit of the slight anti-clockwise rotation of the crank handle 26 without rotating the shaft 14. This construction prevents the operator from accidentally rotating the crank handle 26 since two movements are necessary to actuate the shaft 14, namely a slight anti-clockwise rotation of the crank handle 26 and then two complete revolutions thereof.

Setting means for the type wheels

When the operator dispenses gasoline by rotating the crank handle B, the shaft 11 is rotated by means of the pawl and ratchet connection between the shafts C and 11. Each time, therefore, that the operator rotates the handle B he likewise rotates the shaft 11, but he can operate the crank handle B backwards without pumping gasoline, and this motion would have no effect on the shaft 11. This construction is valuable in as much as it positively prevents the operator from pumping five gallons of gasoline and then by turning the crank handle B in a reverse direction to issue a ticket for only two gallons, or for a smaller quantity than that actually sold. The shaft 11 can, therefore, be rotated in one direction only, and its rotation accurately indicates the number of gallons dispensed.

The shaft 11 extends through the machine near the top thereof, and is provided with two lifting cams 28. Each of these cams are similar in construction, and the cams are clearly shown in Fig. 2, in which it will be noted that there are four similar cam surfaces thereon. Each of the cams 28 engage a pin 29 on the sliding dog 30. The dog 30 is provided with a slot 31 to receive the shaft 11, and with a slot 32 to receive a pin 33 on a resetting member 34. The dog 30 is provided with a nose 35 which engages a ratchet 36 loosely mounted on the shaft 37 secured to a unit's printing wheel 38 of the quantity counter. Each time, therefore, the cam 28 is rotated one-fourth of a revolution, the dog 30 is raised a distance equal to the height of its cam, and the spring 39, secured to a fixed part of the frame and to a pin 40 of the dog 30, pulls the dog downwardly as soon as the nose of the cam has passed beyond the pin 29 so that the nose 35 of the dog 30 engages the ratchet 36 and rotates the same for one notch, which rotates the printing wheel 38 one-eighth of a revolution, for the ratchet 36 is provided with eight teeth. As soon as the type wheel 38, which prints the number of pints dispensed, has been rotated a complete revolution, the adjacent type wheel 41 is rotated one-tenth of a revolution by means of a well-known transfer gear 42. The type wheel 41 prints the number of gallons dispensed, but since it has only ten numerals on its periphery it is necessary to transfer the ten gallon indications to the printing wheel 43, which is likewise accomplished by the well-known transfer gears 42.

In like manner, the other cam 28 operates the dog 30 which registers pints on the total adder 44, the right hand wheel thereof indicating the pints, the second wheel the gallons, the third wheel tens of gallons, the fourth wheel hundreds of gallons, and the fifth wheel thousands of gallons. Obviously additional type wheels can be provided for both the quantity counters 38, 41 and 43, and also for the total adder 44. The date wheels 45 are manually set. Any suitable means may be provided for setting the same or they may be rotated by hand.

The printing wheel 245 prints the indications to show what it was that was sold, such as "H. T." for high test, "Reg." for regular, and obviously any other indications might be set thereon such as oil or the names of the various kinds of gasoline which may be sold. The type wheel 245 is provided with a gear 46 which is in mesh with a large gear 47 which is set by means of a lever 48 protruding through the casing 12. The casing would, of course, be provided with suitable indicia to show the operator where to set the lever or the levers hereinafter to be described. This is clearly shown in both the above mentioned applications. The type wheel 50 is manually set by means of a gear 51 secured thereto, which gear meshes with a gear 52 controlled by hand lever 53. In like manner, the type wheels 54 and 55 are operated by levers 56 and 57 respectively. The type wheel 50 prints the cents, the type wheel 54 the dimes, and type wheel 55 the dollars. The operator, therefore, sets these wheels to print the amount which he is charging the customer for the gasoline or other commodity. A type 58 is also provided on the frame work of the machine adjacent the type wheel 55 to print the dollar mark shown in Fig. 10 and in Fig. 11, being the record and ticket respectively.

Means are provided whereby a consecutive number is printed on both the ticket and the record. The consecutive numbering device is operated by a crank pin 59 on the ratchet 13, which crank pin operates a connecting rod 60 connected to a lever 61 by means of a pin 62. The lever 61 is mounted on a rod 63 in the sidewalls of the machine, and carries at its upper end a pivoted dog 64, which is urged towards a ratchet 65 by means of a spring 66. The ratchet 65 is mounted on the shaft 37, which shaft carries at its inner end a ratchet 68 (Fig. 7) fixedly mounted thereon, which ratchet is secured to a printing wheel 69. Suitable transfer gears 70 connect the printing wheel 69 with tens, hundreds and thousands printing wheels 71, 72 and 73 respectively. Each time, therefore, that the ratchet 13 makes a complete revolution, the dog 64 engages the ratchet 65 and rotates the said ratchet, and shaft 37 with the ratchet 68, one notch, which corresponds to the distance between successive numerals on the unit type wheel 69 of the consecutive counter. The key 74 carries at its inner end a type 75 to print the operator's number such as "101" shown in Fig. 10 of the drawings, that is, on the record. The frame work of the machine is also provided with printing type 76 to print the number of the machine such as "S10", shown in Fig. 10 of the drawings, on the record.

The operator, therefore, turns the crank handle B and this automatically registers the number of pints and gallons pumped on the total register 44, and on the detailed counters 38, 41 and 43. The date wheels are set by hand. The money transaction is set by the levers 53, 56 and 57, the class by the lever 48, while the consecutive counter wheels 69, 71, 72 and 73 are automatically operated by turning the crank handle 26.

*Locking means*

The key 74 must be inserted before the machine can be operated, as is fully described in the said copending applications. This locking means is clearly shown in Fig. 8 of the drawings and need not be described in this application other than to briefly mention that before the key 74 is inserted, the arm 77 holds the rod 80 stationary so that the lower end thereof 82 projects in a channel 83 in a disk 84 on the shaft 14. Unless the key 74 is inserted, therefore, the handle 26 cannot be rotated, and furthermore, the bar 85 engages the teeth of the gears connected to the levers 48, 53, 56 and 57, so that the price of the fluid and its class cannot be set up.

*Operating means for printer*

The pin 62 which operatively connects the connecting rod 60 and the lever 61 is also operatively connected with an oscillating printing carrier 86 which is mounted on the shaft 63. On the other side of the machine, the shaft 14 is provided with a disk 84 carrying a wrist pin 78, which is connected to the oscillating printing carrier 86 by means of pitman 87. The pitmen 60 and 87 move in unison so as to actuate both sides of the printing carrier 86 equally, thereby avoiding the strain that would result if a single pitman were employed. The oscillating printing carrier 86 is provided with a rotatable ink pad 88 (Fig. 2) carried by levers 156 mounted on the shaft 91. The oscillating printing carrier 86 also carries rotatable platens 89 and 90 on the shafts 91 and 92 respectively. The ink pad 88 is resiliently pressed against the printing characters by means of a spring 155 secured to an extension of the lever 156. The lever 156 also extends beneath the shaft 92 which shaft acts as a stop to limit the upward pull of the lever 156 by the spring 155.

As is clearly apparent from Figs. 2 and 9, when the crank handle 26 is rotated clockwise, the ratchet wheel 13 and wrist pin 59 are moved anti-clockwise, during the first 90° rotation, approximately, of the crank handle 26. The oscillating carrier 86 is moved anti-clockwise so as to bring the ink pad 88 from the position shown in Fig. 2 to a position approximately beneath the various type wheels. The ink roller now inks all of the printing wheels as well as the dollar mark, the machine number carried by the body of the machine, and the type on the inner end of the key 74.

As the crank handle 26 continues its rotation between the first 90° of its movement and the first 270° thereof, the platen 90 is brought beneath the type wheels. The ticket strip 94 is thereby pulled from the ticket supply roll 95 and has impressed thereon the characters shown in the last line of Fig. 11.

As the crank handle 26 continues its rotation from its 270° to its 540° position, the pitmen pull the oscillating carrrier 86 to the right as viewed in Fig. 2, or in a clockwise direction, so that the ink pad 88 is again brought into contact with the characters on the printing wheels and the platen 89 is brought beneath the printing characters. The platen 89 carries the record strip 96, which is unwound from a record roll 97, and which passes under a shaft 98 and over a rod 99, which rod is carried between two arms 100 mounted on a shaft 101. The rod 99 is normally pulled upward by means of a spring 102 so as to keep the paper taut. As the platen 89 is brought beneath the printing wheels, an impression is made on the record shown in Fig. 10, and the record strip is readily advanced for the next impression.

The last line on the ticket and the record have now been printed, and as the crank handle 26 moves from its 540° position to its 720° position, the oscillating printing carrier 86 is moved counter-clockwise, and the dog 64 engages the ratchet 65, rotating the shaft 37 a distance equal to one tooth, which moves the unit wheel 69 of the consecutive counter to the next numeral thereon.

Signal operating means

A lever 103 is pivoted on a pin 104 projecting from a sidewall of the machine, which lever 103 is provided with a cam tooth 105, which is actuated by the teeth of a ratchet 47' secured to the shaft 37. A bell 106 is secured to one of the sidewalls of the machine, and is sounded by means of a clapper 107 carried by the lever 103. As the ratchet wheel 47' is actuated by the dog 64, ratchet 65, and shaft 37, the tooth of the ratchet immediately beneath the cam tooth 105 of the lever 103 engages the tooth 105 on the lever 103 and moves the clapper from the inner surface of the bell 106. As soon as the tooth on the ratchet passes the cam tooth 105, a spring 108 pulls the lever 103 downwardly so that the clapper 107 strikes the bell 106 and gives an audible signal.

Ticket issuing means

The shaft 14 has rigidly mounted thereon a disk 109 (Fig. 7) and a segmental gear 110, which gear 110 is also provided with a disk surface which extends for approximately 240°. A pinion 112 is rigidly secured to a shaft 113. The shaft 113 carries a platen 120, and the shaft 119 carries an electrotype 121 adapted to print all of the ticket shown in Fig. 11, with the exception of the last line thereon. The electrotype 121 engages an ink roller 122 which is pulled downwardly against the electrotype 121 by means of a lever 123, spring tensioned against the shaft 124 on which the ink roller 122 is mounted. The shaft 124 is mounted within a slot 125 in the sidewalls of the casing.

As the crank handle 26 is rotated the disk 109 and gear 110 rotate in an anti-clockwise direction but the pinion 112 is not actuated until the crank handle 26 has made almost a complete revolution. The pinions 112 and 118 are now rotated, feeding the ticket strip 94 between the platen 120 and the electrotype 121.

The electrotype 121 is inked by means of the rotatable ink roller 122. The ticket after having first had the information printed on the last line thereof and subsequently having impressed thereon the printed matter from the electrotype 121, is issued through a slot 126 immediately below a serrated knife blade 127, carried by brackets 128 secured to the sidewalls of the machine. The ticket is now in a position to be grasped by the purchaser and removed from the machine.

Resetting means

As before mentioned, a ratchet 68 is provided on the shaft 37, which ratchet is rotated one step at the completion of the operation of the machine. An arm 130 is secured to the shaft 131 rotatably mounted in the sidewalls of the machine, which arm 130 is in engagement with the ratchet 68, as is clearly shown in Fig. 6. The shaft 131 is also provided with an arm 132 which has a slot 133 therein, which slot receives a pin 134 on the resetting member 34. The resetting member 34 is provided with two small shafts 135 and 136 which carry arms 137 and 138 similar to the arm 139 of the resetting member 34, so that all of the arms 137, 138 and 139 move in unison. As the ratchet 68 is rotated one notch, the arms 130 and 132 are rotated in a counter-clockwise direction as viewed in Figs. 2 and 6, so that the slot 133 engaging the pin 134 on the resetting member 34 rocks the resetting member 34 in a clockwise direction as viewed in Fig. 2, so that the projections 140 on the arms 137, 138 and 139 are brought into the path of movement of the lug 141 carried on the shaft 37. At the same time the pin 33 engages the side of the slot 32 rotating the sliding dog 30 clockwise and removing the nose 35 thereof so that it cannot actuate the units counter. As the resetting member 34 moves clockwise, as described, the pin 142 carried thereby engages a holding dog 143, depressing the same against the tension of the spring 144, so that the holding dog is moved out of engagement with the ratchet 36. Furthermore, as the resetting member 34 moves clockwise, one side thereof engages a pin 145 carried by an arm 146 mounted on a shaft 147. The shaft 147 is provided with arms 148 which carry the transfer gears 42. Each of the type wheels 38, 41 and 43, which are the type wheels that print the quantity of liquid dispensed in that transaction, are provided with coil springs 150 secured to the inner periphery of these wheels and to the shaft 37, as shown in Fig. 5.

When, therefore, the ratchet 68 is rotated one notch, the arms 130 and 132 are rotated anti-clockwise and the resetting member is rotated clockwise. The pin 142 now disengages the holding dog 143 from the ratchet 36. The resetting member rotates the arm 146 anti-clockwise and raises the arm 148 so that the transfer pinions 42 are disengaged from the transfer gears, while the noses 140 of the resetting members are in the path of the movement of the lugs 141. The type wheels 38, 41 and 43 are now free to rotate, and the springs 150 rotate each of them until the lug 141 strikes the nose 140 whereupon they are stopped. As the crank handle completes its rotation, the arm 130 assumes the position shown in Fig. 6, and the resetting member 34 moves into the position shown in Fig. 2, so that the transfer gears 42 first engage their respective gears on the type wheels 38, 41 and 43 and the nose 140 is then withdrawn out of the path of movement of the lug 141, while the spring 144 pulls the holding dog 143 into holding engagement with the ratchet 36.

In order to print subsequent tickets and records, it is necessary to rotate the crank handle 26 in an anti-clockwise direction until the tooth 27 engages the dog 16 which trips the dog into the position shown in Fig. 9. It is then only necessary to pump the required quantity by rotating the crank handle B, and then resetting the levers 48, 53, 56 and 57 to the price charged, and operating the crank handle 26 two complete revolutions.

We are aware of the fact that machines which print and issue tickets, and which print records of the various transactions are well known. This invention is, therefore, confined to a machine operated in whole or in part by a liquid dispensing device, and which machine provides a complete record of the various transactions performed, and issues to each customer a receipt showing the amount of the transaction and what he purchased.

Under ordinary conditions both the ticket and the record should be printed, but, if for any reason a ticket is not desired, a record alone could be printed by simply removing the ticket paper, or in like manner the ticket alone could be printed without a record by removing the record paper. The machine, therefore, is flexible and will print a ticket, or record, or both. The circumstances, however, in which it would not be desirable to print both a ticket and a record would be very unusual indeed.

In the embodiment heretofore described, the total counter 44 was not reset, but the type wheels which printed the quantity of liquid purchased at that transaction were automatically reset by the operation of the machine. The handles of some gasoline pumps, however, must be rotated in one direction to pump the fluid and must then be rotated in the opposite direction for an equal number of turns before more fluid can be pumped. In such machines it may be advisable to reset the printing wheels showing the quantity purchased by the reverse rotation of the pump crank handle. Such a means is shown in Fig. 12 of the drawings, which means constitutes a modification.

The shaft 11 is rotated as heretofore described, which shaft carries the arm 170 which carries a spring arm 171 engaging a ratchet 172, which ratchet carries a gear 173 loosely mounted on the shaft 11. The gear 173 meshes with a gear 174 secured to the units wheel of a total adder 175, which total adder is identical in construction with the total adder 44. A gear 176 is also carried on the shaft 11 and is secured thereto by means of a collar 177 and pin 178. The gear 176 drives a gear 179 attached to the units wheel 180 of a quantity counter which prints the quantity of fluid purchased by the customer. Suitable transfer gears are employed for both the quantity counter and the total adder. All of the other printing wheels are set as heretofore described.

In the modification, it is obvious that as the shaft 11 is rotated when the filling unit is pumping, the gears 174 and 179 will be rotated, setting up the quantity of gasoline purchased on the quantity counter and adding that amount to the total adder 175. As the crank handle B is rotated in the opposite direction to return it to its original position, the shaft 11 will be rotated in the opposite direction so that the quantity counters will be reversely rotated to their original position. This reverse rotation of the shaft 11, however, will have no effect on the total adder 175, for the spring arm 171 will ride over the teeth of the ratchet 172.

We realize that many changes might be made in the specific construction of this machine without departing from the spirit thereof. We, therefore, desire to cover this invention in whatever form it may be embodied, which may fairly fall within the scope of the appended claims.

Having now desribed our invention, we claim:

1. In a machine of the class described, a shaft, a ratchet thereon, a counter on said shaft, an actuating shaft, reciprocating means actuated by said actuating shaft to operate said counter to register the quantity of liquid dispensed, and means controlled by said ratchet to render said reciprocating means inoperative when the counter is being reset.

2. In a machine of the class described, a shaft, a ratchet thereon, a counter on said shaft, a holding means for said counter, an actuating shaft, reciprocating means actuated by said actuating shaft to operate said counter to register the quantity of liquid dispensed, and means controlled by said ratchet to render said reciprocating means and said holding means inoperative when the counter is being reset.

3. In a machine of the class described, a shaft, a ratchet thereon, a counter on said shaft, a stop on said counter, an actuating shaft, reciprocating means actuated by said actuating shaft to operate said counter to register the quantity of liquid dispensed, a resetting member, and means controlled by said ratchet to render said reciprocating means inoperative and to bring said resetting member into the path of movement of said stop when the counter is being reset.

4. In combination, a shaft rotated by a moving part of a pump, a quantity counter, means whereby said shaft actuates said counter, a consecutive counter and means whereby the actuation of said consecutive counter controls the resetting of said quantity counter.

5. In a machine of the class described, a quantity counter, actuating means therefor, a consecutive numbering device, a printing device and means actuated by said printing device to actuate said consecutive numbering device and to control the resetting of said counter.

6. In a machine of the class described, a quantity counter, a reciprocating member to actuate said counter, a zero setting device and means whereby said zero setting device rocks said reciprocating member to render the same inoperative each time said zero setting device is operated.

7. In a machine of the class described, a quantity counter, an operating member therefor, a consecutive numbering device, a zero setting device and means whereby said consecutive numbering device controls said zero setting device and renders said operating member inoperative.

8. In a machine of the class described, a quantity counter, an operating member therefor, a consecutive numbering device, a zero setting device and means whereby said consecutive numbering device controls the operation of said zero setting device and said operating member.

9. In a machine of the class described, a quantity counter, a reciprocating member whereby said counter may be actuated, said reciprocating member being provided with a slot, a resetting member, a pin carried thereon acting through said slot and means whereby said resetting member may be rocked when said counter is being reset so that said pin engages the side of said slot and rocks said reciprocating member out of engagement with said counter.

10. In combination, a quantity counter, a consecutive numbering device and a printer, means carried by said printer to actuate said consecutive numbering device after said printer has made its impression and means controlled by said consecutive numbering device to reset said counter to zero.

11. In a machine of the class described, a quantity counter, an oscillating printing carrier, a shaft, means whereby said printing carrier partially rotates said shaft and means whereby said partial rotation of said shaft controls the resetting of said counter to zero.

12. In a machine of the class described, a quantity counter, an oscillating printing carrier, a shaft, actuating means for said counter, a resetting member therefor, means whereby the operation of said printing carrier partially rotates said shaft and means controlled by the partial rotation of said shaft to rock said operating member and said resetting member.

13. In a machine of the class described, a quantity counter, a resetting member, means whereby said resetting member may be rocked, an operating member for said counter, a transfer arm and a holding dog and means whereby the rocking of said resetting member rocks said actuating member and holding dog out of engagement with said counter and moves said arm out of association with said counter.

14. The combination with a shaft and a quantity counter actuated thereby, of resetting means for said counter, a consecutive numbering device, and printing means whereby an impression may be taken from said quantity counter, and consecutive numbering device, said printing means controlling the operation of said consecutive numbering means and said consecutive numbering means controlling the operation of said resetting means.

15. The combination of a shaft with a quantity counter, means whereby said shaft actuates said quantity counter, a consecutive numbering device, actuating means therefor, and means whereby said quantity counter is reset in timed relation to the actuation of said consecutive counter.

In testimony whereof we affix our signatures.

JOHN F. OHMER.
GROVER C. COIL.